Oct. 20, 1953          A. FISCHBACH ET AL          2,656,402
ELECTRODE FOR PRIMARY BATTERIES
Filed Sept. 25, 1951
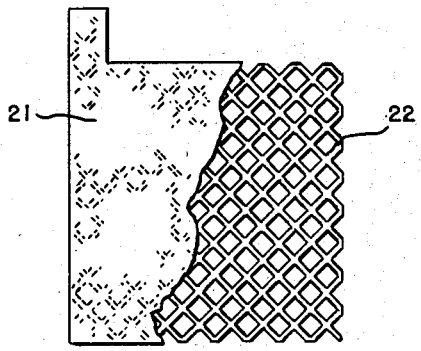
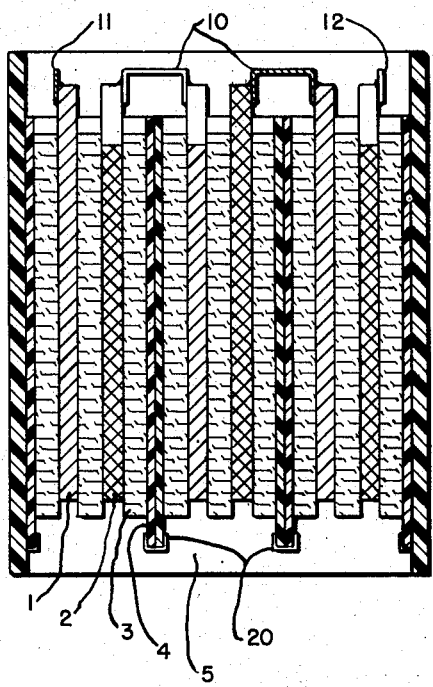
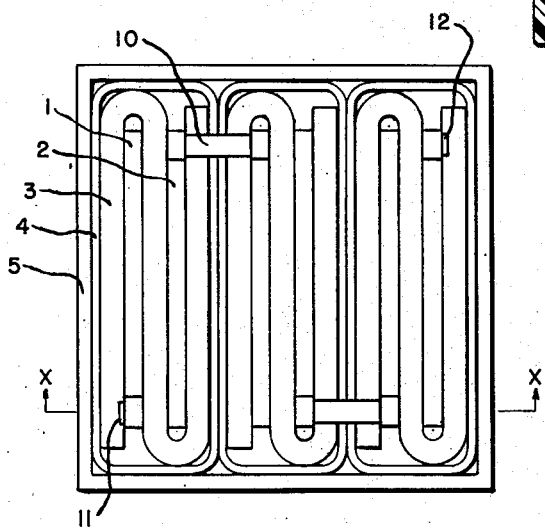
INVENTORS
ADOLPH FISCHBACH
FREDERICK HOCHBERG
BY
*Harry M. Saragovitz*
*Attorney*

Patented Oct. 20, 1953

2,656,402

UNITED STATES PATENT OFFICE 2,656,402

ELECTRODE FOR PRIMARY BATTERIES

Adolph Fischbach, Allenhurst, and Frederick Hochberg, Red Bank, N. J., assignors to the United States of America as represented by the Secretary of the Army Application September 25, 1951, Serial No. 248,261

3 Claims. (Cl. 136—126)

(Granted under Title 35, U. S. Code (1952), sec. 266)

The invention described herein may be manufactured and used by or for the Government for governmental purposes without the payment of any royalty thereon.

This invention relates to porous zinc-cadmium electrodes for primary batteries and to methods of making such electrodes.

It is a general object of this invention to produce a lightweight, porous, zinc-cadmium electrode of greatly improved mechanical strength which electrode may be used as a negative electrode in various electro-chemical systems providing in each case a battery of high capacity per unit of weight and volume, high discharge rate and excellent operating characteristics at temperatures as low as $-70°$ F. As against the porous zinc electrode described in our copending application, Serial No. 233,928, filed June 27, 1951, now Patent No. 2,640,864, the present zinc-cadmium electrode exhibits various improvements particularly with respect to mechanical strength, ease of manufacture and better handling in mass production.

The invention will become more apparent from the following description and accompanying drawing of a multiple cell, deferred action type (dunk-type) meteorological battery in which zinc-cadmium electrodes according to the invention are used as negative electrodes.

In the drawings:

Fig. 1 is an elevational view of an electrode according to the invention with the active electrodic material partly removed.

Fig. 2 is an enlarged sectional view taken along line X—X of Fig. 3 which is a top view of a dunk-type battery consisting of three cells.

Referring to Fig. 1 the grid 22 consists of a gauze, net or screen made of very thin metal wire such as copper, silver, nickel, aluminum or the like. This screen wire may be as thin as 0.01" or less. The thickness of a screen is about double the thickness of the wire used to weave the screen; it is, however, possible to press the woven screen down almost to the thickness of a single wire. If, therefore, extremely thin grids are required, the screens are pressed after weaving. Various wire screens, e. g., 16/16 or 45/45 mesh, using various thicknesses up to 0.02" and more have been satisfactorily used. Finished pasted electrodes, with less than about 0.04" thickness and of extremely light weight can thus be made.

If copper wire is used it is advantageous to electro-plate the wire with a protecting and impervious coating of lead, manganese or preferably zinc or cadmium which coatings prevent corrosion or dissolution of the screen metal by the electrolyte. If the battery is to be used as a "one-shot" battery (which is discarded after initial use) the copper wide does not have to be coated. However, where the battery is expected to have good charge retention after activation it is better to protect the grid material. The screen may or may not be pressed before the protective coating is put on.

In preparing the porous zinc-cadmium electrode according to the invention a paste is prepared by mixing the oxides of zinc and cadmium (both preferably chemically pure) with water. The mixture of the oxides of cadmium and zinc may contain between 5 to 50% cadmium. This mixture is now pasted into the grids and the pasted plates are then air or oven dried. After drying they may be exposed to heat for a very short time (10 to 15 seconds) at temperatures of about 500 to 700° C. to harden the surface of the paste so as to prevent shedding of the oxides on subsequent immersion into the forming solution. The forming of the plate electrodes with or without said heat treatment of the surface is preferably carried out in dilute alkaline solution. During the formation the active material expands and the end result is a mixture of metallic zinc and cadmium of very spongy structure. After formation the plate may be given a light rolling without too much pressure to reduce the thickness of the plate without impairing its spongy structure. Any other equivalent mechanical treatment may be used which brings the plate near to the original thickness. The plate is then thoroughly washed to remove the forming solution and is then air or oven dried.

The porous zinc-cadmium electrode made according to the invention may be used as a negative electrode in combination with various electro-chemical systems and suitable acid or alkaline electrolytes. It may, for instance, be used with a silver peroxide or mercuric oxide counterelectrode and potassium hydroxide as electrolyte; or it may be used with a lead peroxide counterelectrode with sulphuric acid or fluorboric acid as electrolyte. In any such combination the porous zinc plate furnishes batteries of relatively high capacity and high discharge rates at temperatures as low as $-70°$ F.

The new porous zinc-cadmium electrode is particularly suitable for meteorological batteries of the deferred action type as illustrated in Figs. 2 and 3 which show a dunk-type battery consisting of three cells. Each of the three cells comprises two thin, flat plate electrodes, one a negative electrode 1 consisting of spongy zinc-cadmium made according to the invention and the other a positive lead peroxide electrode 2. A spacer 3 of bibulous sheet material surrounds both electrodes laterally, thus separating the electrodes 1, 2 from each other and from the insulating sheet material which constitutes the hull 4 of the cell. This hull or cell container 4 holds the elements of the electrode-spacer structure laterally together under pressure contact but leaves top and bottom of the electrode-spacer structure open. The bibulous spacer 3 may consist of paper, woodpulp, microporous rubber, glass wool or other liquid retaining materials, inert to the action of the acid electrolyte. The thickness of the spacer 3 is designed to soak up enough electrolyte (not shown) to allow complete utilization of the active material of the electrodes 1, 2.

The cell hull 4 consists of suitable plastic sheet material such as polystyrene, various poly-vinyl resins, synthetic rubber or other elastomers, Scotch tape, etc. A plurality of such cells in juxtaposition can be easily and tightly packaged, for instance, in an open frame structure or battery frame 5 which surrounds the cells laterally and is of such inner dimensions that the desired number of cells are closely and immovably held together. The battery frame 5 may consist of any of the materials used for the cell hull 4 as enumerated above. Metal tabs 10 electrically connect successive cells in conventional manner; the positive electrode of one end cell and the negative electrode of the other end cell each being provided, respectively, with a positive terminal 11 and a negative terminal 12.

To activate the above-described battery, it is immersed partially into sulphuric acid or fluorboric acid electrolyte for about one to three minutes, depending on the size of the battery and the nature of the bibulous material of the spacers 3. After this time, the battery is withdrawn from the liquid electrolyte, shaken to remove excess liquid and is then ready for use.

In order to prevent accumulation of liquid electrolyte at the lower edges of the cell container 4, a film 20 of water repellent substance, e. g., petroleum jelly, silicone resins or the like is painted on the lower portions of the sheet material constituting the cell container 4. This film 20 prevents leakage currents which otherwise would follow the electrolyte film accumulated on the lower edges of the hull 4.

The porous zinc-cadmium electrode according to the invention, whether it be used in the above-described battery or in any other suitable battery, will show in addition to its excellent electric characteristics a relatively very high mechanical strength.

What is claimed is:

1. A method of making an extremely lightweight, porous, zinc-cadmium negative electrode of high mechanical strength for primary radio sonde batteries in which the negative electrode is made by pasting the active material into a supporting grid and subsequent drying and forming the pasted electrode characterized by making a pasty mixture of zinc oxide, cadmium oxide and water, pasting said mixture into a supporting metal screen, drying said pasted plate electrode and forming it cathodically in a forming solution to obtain a mixture of sponge zinc and sponge cadmium and finally washing and drying said porous zinc-cadmium electrode.

2. A method of making an electrode according to claim 1 in which said pasted and dried plate electrode is submitted for a very short time to temperatures above 300° C.

3. A method of making electrodes according to claim 1 in which the pasty mixture of zinc oxide and cadmium oxide contains between about 5 to 50% cadmium.

ADOLPH FISCHBACH.
FREDERICK HOCHBERG.

References Cited in the file of this patent

UNITED STATES PATENTS

| Number | Name | Date |
| --- | --- | --- |
| 294,464 | Haid | Mar. 4, 1884 |
| 745,588 | Ford | Dec. 1, 1903 |
| 945,243 | Morrison | Jan. 4, 1910 |
| 1,304,852 | Chamberlain | May 27, 1919 |
| 1,451,801 | Angell | Apr. 17, 1923 |
| 2,254,286 | Hauel | Sept. 2, 1941 |

FOREIGN PATENTS

| Number | Country | Date |
| --- | --- | --- |
| 363,425 | France | July 31, 1906 |